(12) United States Patent
Keller et al.

(10) Patent No.: US 8,204,348 B2
(45) Date of Patent: Jun. 19, 2012

(54) COMPOSITE, OPTICAL FIBER, POWER AND SIGNAL TACTICAL CABLE

(75) Inventors: David Keller, Cary, NC (US); Paul Kroushl, Lancaster, PA (US); Wayne Chu, Wilson, NC (US)

(73) Assignee: Nexans, Paris (FR)

( * ) Notice: Subject to any disclaimer, the term of this patent is extended or adjusted under 35 U.S.C. 154(b) by 436 days.

(21) Appl. No.: 12/494,583

(22) Filed: Jun. 30, 2009

(65) Prior Publication Data

US 2010/0329614 A1  Dec. 30, 2010

(51) Int. Cl.
*G02B 6/44* (2006.01)

(52) U.S. Cl. ....................................................... 385/101
(58) Field of Classification Search ................... 385/101
See application file for complete search history.

(56) References Cited

U.S. PATENT DOCUMENTS

| | | | |
|---|---|---|---|
| 4,703,134 A * | 10/1987 | Uematsu | 174/106 SC |
| 5,237,635 A | 8/1993 | Lai | |
| 5,418,878 A | 5/1995 | Sass et al. | |
| 5,905,833 A * | 5/1999 | Sheu | 385/109 |
| 6,288,372 B1 * | 9/2001 | Sandberg et al. | 219/544 |

FOREIGN PATENT DOCUMENTS

JP  57005011 A  1/1982

\* cited by examiner

*Primary Examiner* — Uyen Chau N Le
*Assistant Examiner* — Hoang Tran
(74) *Attorney, Agent, or Firm* — Sofer & Haroun, LLP (57) ABSTRACT

A composite cable includes at least two optical fiber components and at least one additional component. An irradiated crosslinked jacket surrounds the optical fiber component and the at least one additional component. A shield encloses at least the two optical fiber components within the jacket, where the shield protects the optical fibers from irradiation of the crosslinked jacket.

11 Claims, 7 Drawing Sheets

COMPOSITE CABLE

COMPOSITE, OPTICAL FIBER, POWER AND SIGNAL TACTICAL CABLE

BACKGROUND

1. Field of the Invention

This application relates to cables. More particularly, this application relates to composite fiber optic, power and signal type cables.

2. Related Art

Figure 1:
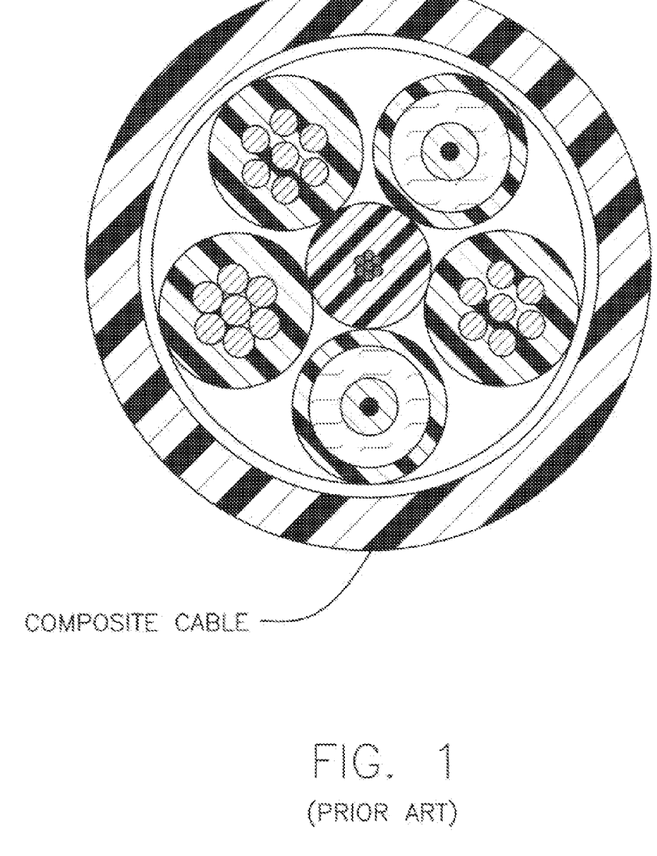
FIG. 1 shows a prior art composite cable.

In the art of cable production, composite cables are cables that combine both power conductors as well as signal cables within a single outer jacket. Such cables can be used for many self contained power/signal transmission connections. A common use for such composite cables is for connecting cameras, such as CCD security cameras, for providing power, signal transmission and actuator control of the camera. See for example prior art FIG. 1 wherein various cable types are included within a single jacket.

A number of such composite cables are offered with various constructions, typically as an assembly of copper and fiber elements. However, such prior art cables lack the ability to deliver the power necessary over distances of 300 to 5000 ft, nor the ability to carry a 20-400 volt range and 0.5 to 5 amps with sufficient ground safety factors protecting from eventual flex failure. Furthermore, the prior art cables also lack sufficient jacket crosslink to survive 24 hours at 100 degree C. in heavy diesel fuel. An exemplary standard that employs such test parameters is EIA/TIA-455-12A.

To achieve such a cable it is highly desirable to have a well-crosslinked polymer jacket for the composite cable. Crosslinking of the polymer in the jacket provides, among other advantages, improved heat resistance, decreased permeability and better abrasion resistance.

One manner in achieving fast and complete crosslinking of the polymer jacket, so as to make it sufficiently crosslinked to survive diesel oil soak, is to use a process of electron beam processing (or E-beam processing) where the jacket is subjected to irradiation by a high energy electron beam. Although this has the advantage of providing a well cross linked jacket, if optical fibers are included in the cable under this jacket process, the fiber element of the composite cable is also inadvertently subject to the irradiation as well. Such irradiation from an E-beam processor, as with any radiation exposure (background radiation post installation etc. . . . ) can cause noticeable signal attenuation in the fibers, as the material of the fibers is altered/damaged during the irradiation process.

OBJECTS AND SUMMARY

The present arrangement provides a composite cable with optical fiber, power and signal tactical elements, that has an improved durability and may be used longer before flex-failure, and even after flex failure in some cases. Moreover, the composite cable is constructed so that the fiber component therein is protected during the crosslinking process used on the cable jacket.

In one arrangement, the present invention provides for utilization of shields to prevent e-beam damage to optical fiber. Through the utilization of material that can be exposed to multiple crosslinking methods, the e-beam crosslinking, method can be used initially, and followed by other crosslinking methods such as moisture, curing to complete the process to sufficiently reach a crosslink density enabling the plastic to withstand 24 hours in 100 C diesel fuel, under the EIA/TIA-455-12A testing standard.

In another arrangement, the optical fiber component shields are utilized to supplement the bare ground wire enabling the composite cable to be more readily monitored for power loss failure for conductor jacket rupture from excessive flexing due to human or environmental factors.

BRIEF DESCRIPTION OF THE DRAWINGS

The present invention can be best understood through the following description and accompanying drawings, wherein.

DETAILED DESCRIPTION

Figure 2:
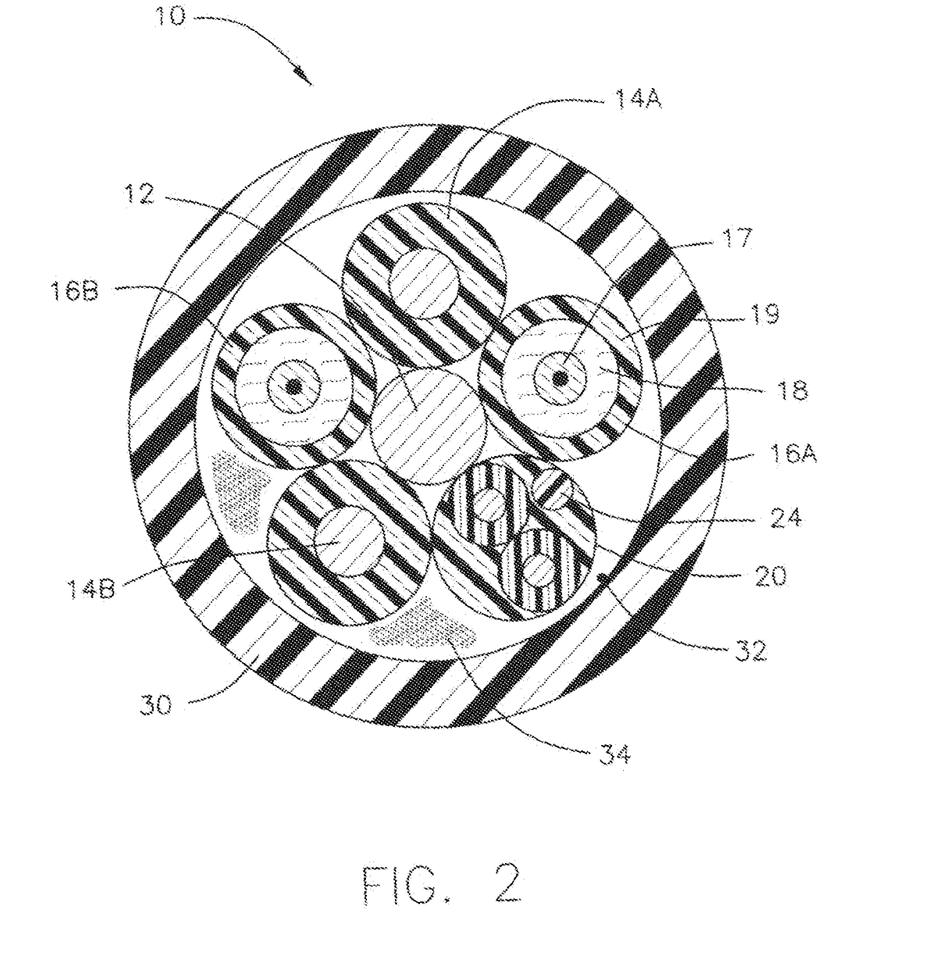
FIG. 2 shows a composite cable, in accordance with one embodiment.

In one embodiment, as shown in FIG. 2, a composite cable 10 is shown having a central grounding member 12. Preferably, central grounding member 12 is constructed as a copper wire, such as size 14 (AWG) copper wire, however, the invention is not limited in that respect.

Surrounding central grounding member 12, are two conductor wires 14A and 14B. Preferably, conductor wires 14 are constructed as copper wires, such as size 18 (AWG) copper wire, however, the invention is not limited in that respect. Conductor wires 14 make up the electrical carrier component of composite cable 10.

In one arrangement, in the case of grounding member 12 and conductors 14, fine stranded tinned copper is used to improve the flexibility of those members and thus the entire cable 10 as a whole.

Also positioned around central grounding member 12, are two fiber optic elements 16A and 16B. Preferably, fiber optic elements 16 are tight buffer optical fibers 17, surrounded by an aramid filler 18 within a larger flame retardant jacket (subunit) 19. However, the invention is not limited in that respect. This construction of optical fiber elements 16 provides additional strength and flexibility to these members and the cable 10 as a whole.

Also surrounding central grounding member 12, as shown in FIG. 2, is a twisted pair 20 for digital signal transmission. Also, a drain wire 24 may be included with pair 20 for additional fault protection.

The above components are encased within an outer jacket 30, such as an extruded polymer jacket made from polyurethane or polyethylene. Within jacket 30, a rip cord 32 may be used for easy removal of the jacket and additional aramid filler fibers 34 may be included for added tensile strength. Aramid fibers 34 may be added to cable 10 in a 3-6" contrahelical lay length to facilitate flexibility while simultaneously adding strength. Additionally, aramid fibers 34 may be coated with super absorbent polymers to provide a barrier against water ingress into cable 10.

Once cable 10 is constructed as set forth above, it is contemplated that the polymer of jacket 30 is crosslinked in order to improve the durability, abrasion resistance, and other various advantageous qualities to the jacket. Polymers may be formulated such that the crosslinking is performed in various modes, including CV (Continuous Vulcanization), E-beam and Silane/Moisture curing. In one of the arrangements, jacket 30 is crosslinked using the E-beam mode because of its thorough/complete crosslinking, cleanliness and low secondary material costs. It is contemplated that such e-beam processing of jacket 30 may be affected with incremental processing (several iterations). This lessens the damage to fiber elements 14, allowing them to at least partially recover between iterations. Any of the embodiments described herein may be used in conjunction with this incremental processing of jacket 30 by e-beam.

In another arrangement, in order to reduce damage to fiber elements 14, jacket 30 may be constructed of a polymer capable of multi-mode crosslinking. For example, in one arrangement, upon the formation of jacket 30, crosslinking may be partially affected by e-beam irradiation to an extent not to cause damage to fiber elements 14 therein. Later, crosslinking of the jacket may then be completed using other methodologies, including but not limited to moisture/humidity processing, Silane cure, peroxide cure or some combination of these methods. This provides at least some advantages of the e-beam type cross linking, without excessive irradiation reaching fiber elements 30.

In either arrangement, it is contemplated that the crosslink density of jacket 30 should advantageously enable the polymer to withstand 24 hours in 100 C diesel fuel without failure, as per the EIA/TIA-455-12A testing standard.

As shown in FIG. 2, the assembly of the components described above, are configured to be evenly distributed around ground member 12 so as to have consistent stiffness and flexibility. Additionally, in one arrangement, conductors 14, fiber elements 16 and twisted pair 20 may be advantageously stranded around central member 12 The components are helically stranded about the center element of themselves with a preferred lay length from 3-7 inches.

In such an arrangement, with the elements of composite cable balanced around central member 12, cable 10 is capable of flexing in every direction with less chance of achieving a fault. Also, even if a partial fault is found in one of the components, because they are centrally located near the central grounding member 12, the frayed ends of the faulted component will ground, allowing the other components to continue until cable 10 is replaced.

Figure 3:
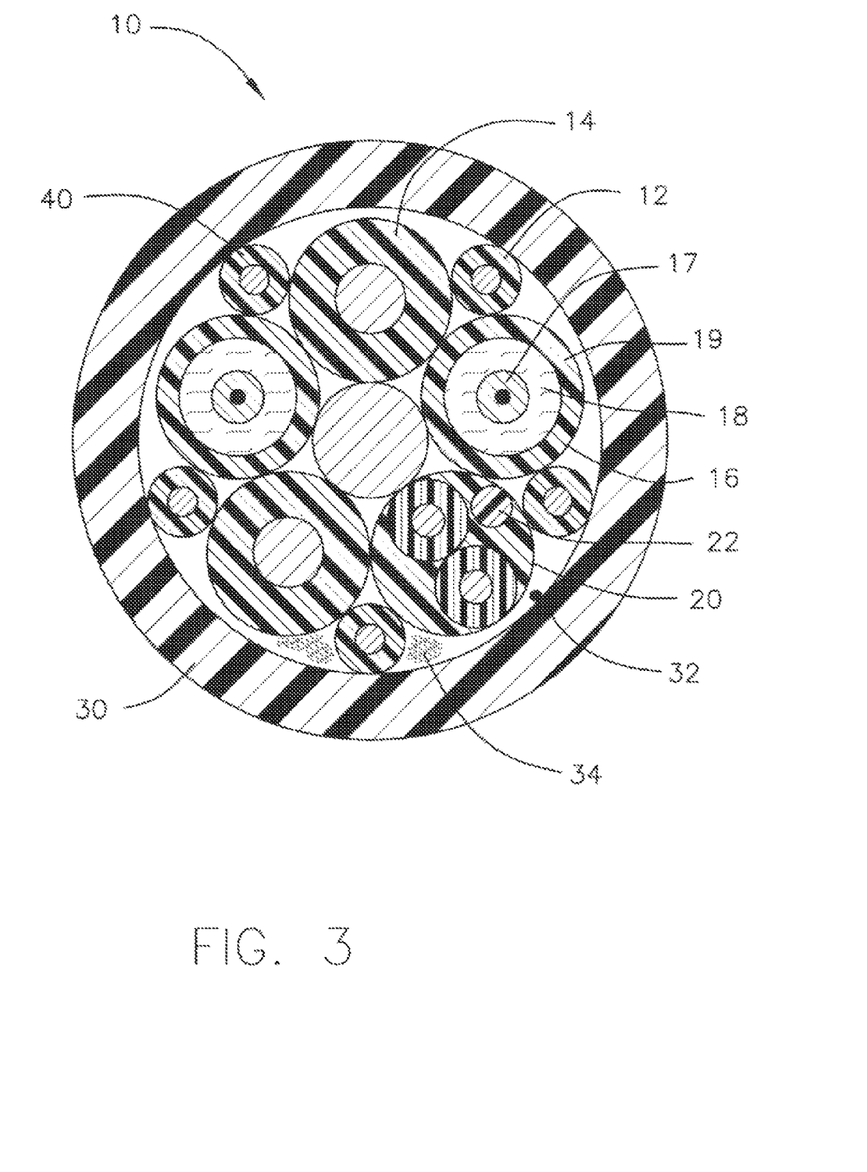
FIG. 3 shows a composite cable, in accordance with another embodiment.

In another arrangement, as shown in FIG. 3, up to an additional 5 jacketed conductors 40, such as 26 AWG copper wires, may be added for additional uses such as part of a ground fault alarm system and or a digital electrical communication signal.

Figure 4A:
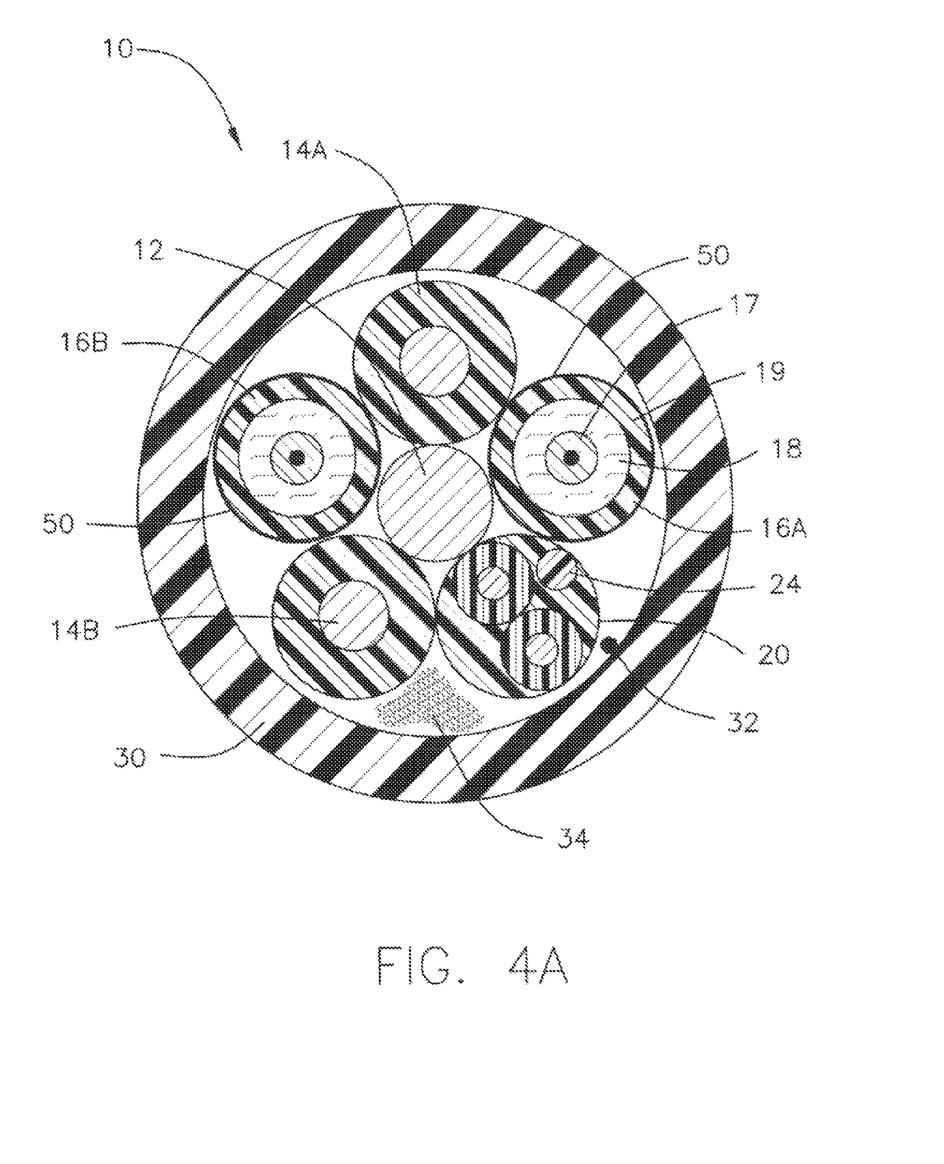
FIGS. 4A-4D show composite cables of FIG. 2, with a shield element, in accordance with one embodiment.

In another embodiment as shown in FIG. 4A, a shield 50 is provided around at least one set of components of cable 10, namely fiber elements 14A and 14B. This shield 50 is arranged to provide irradiation protection for the optical elements 17 to prevent attenuation causing damage during the E-beam irradiation/crosslinking of jacket 30. Shield 50, which is grounded, is able to draw electrons from the e-beam process that contact shield 50 away from fiber elements 12 therein.

Figure 4B:
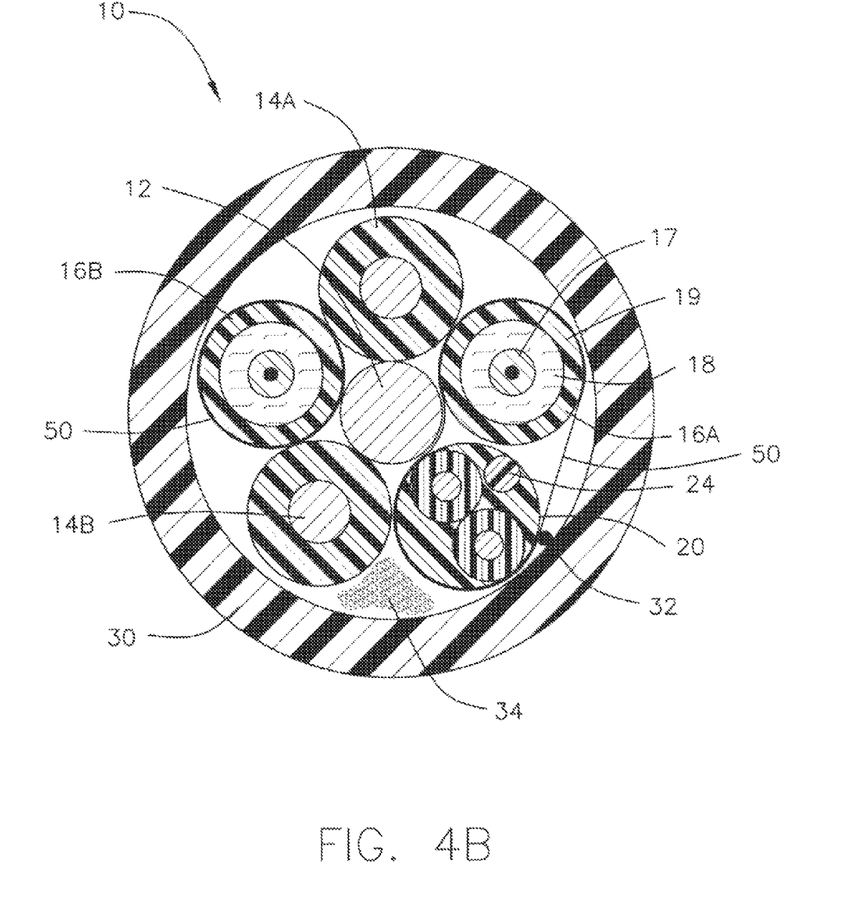
Figure 4C:
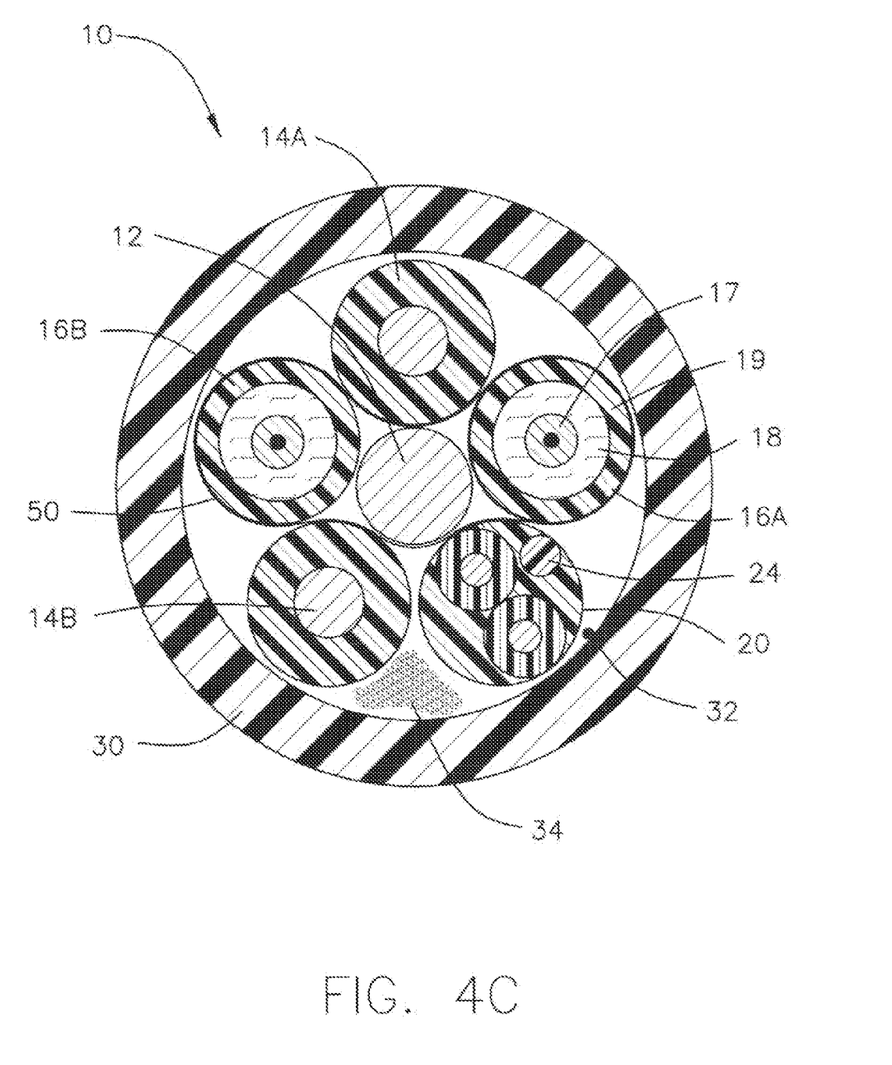
Figure 4D:
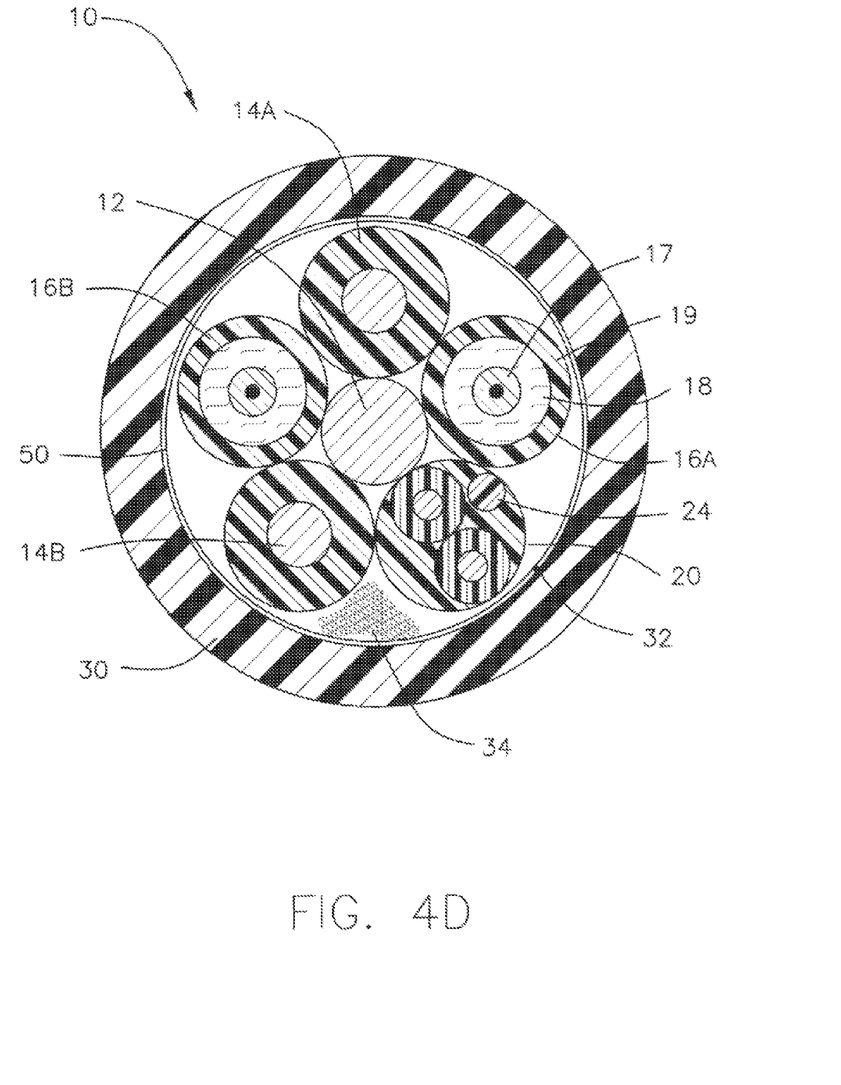

As shown in FIGS. 4B, 4C and 4D shield 50 may be arranged around additional components a well. For example, FIG. 4B depicts one portion of the shield 50 covering twisted pair 20. In FIG. 4C, a unitary shield 50 covers both fiber elements 14 as well as twisted pair 20. In FIG. 4D, the shield extends around all of the internal components of cable 10. Although the arrangement of FIG. 4D would protect fiber elements 14 during cross linking irradiation of jacket 30, the other limited size shield arrangements of shield 50 shown in FIG. 4A-4C may be additionally advantageous in that they may be formed of minimal size so as not to add substantial cost or weight to composite cable 10, both of which are significant, particularly in densely packed composite type cables.

In one arrangement, when shield 50 is used in conjunction with a jacket 30 that has been crosslinked with partial e-beam and partial humidity crosslinking, it is contemplated that there can be a reduction in the size and/or thickness of shielding 50 to account for the lesser need to protect against the more limited electron radiation.

It is noted that in addition to shield 50 protecting fiber elements during irradiation of jacket 30, it additionally may serve as a grounding fault protection in the event one of the conductors 12 experiences an insulation breech. For example, shield 50 and central bare copper element 12 may be arranged to signal copper power loss in conductors 14 from rupture of cable 10 from excessive flexing.

The material used for shield 50 may be selected from any number of materials including, but not limited to silver, nickel, tin plate, copper, lead, graphite, carbon and aluminum (sheet or vacuum deposit).

In one arrangement shield 50 is made from a laminate of aluminum, nickel, tin plate, copper and lead, so as to screen out all of the potential radiation from the crosslink process as well as radiation from the use environment either from nearby equipment, power plant normal operation or calamity, landfill leakage, munitions leakage, weapons accidental or intentional discharge. It is also contemplated that shield 50 may be made from a more basic aluminum/nickel material.

In one arrangement, shield 50 (individually or combined as per the embodiments shown in FIG. 4A-4D) may have a thickness range of 0.0005" to 0.002," and preferably 0.001" individually or combined. It is contemplated that shield 50 may have a plastic laminate on one or more sides of thickness of 0.0005 to 0.001, to aid in processing or applying shield 50 to cable 10.

The shield should be of sufficient material/dimension so as to prevent or substantially prevent damage to fiber elements 14 during the complete or partial E-beam irradiation of jacket 30.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A composite cable comprising: at least two optical fiber components; at least one additional component; an irradiated cross-linked jacket surrounding said optical fiber component and said at least one additional component; and a shield enclosing at least said two optical fiber components with said jacket, wherein said shield protects said optical fibers from irradiation of said cross-linked jacket; wherein said irradiated cross-linked jacket forms the outer surface of said cable and maintains sufficient crosslink density by a combination of e-beam processing and ambient humidity to withstand 24 hours in 100° C. diesel fuel without failure.

2. The composite cable as claimed in claim 1, wherein said additional component includes at least one twisted pair of conductors for transmitting electromagnetic signals.

3. The composite cable as claimed in claim 2, wherein said shield is a single shield enclosing both said fiber optic components and said twisted pair of conductors.

4. The composite cable as claimed in claim 1, wherein said shield is a single shield enclosing both said fiber optic components.

5. The composite cable as claimed in claim 1, wherein said shield is a two separate shield elements each enclosing one of said fiber optic components.

6. The composite cable as claimed in claim 3, wherein said cable further comprises at least one insulated conductor wire for power transmission.

7. The composite cable as claimed in claim 6, further comprising a bare conductor element, disposed centrally, for grounding in the case of a fault.

8. The composite cable as claimed in claim 7, wherein said shielding and said centrally disposed bare conductor element provide grounding in the case of a fault.

9. The composite cable as claimed in claim 8, wherein said twisted pair component, fiber component and insulated jacket components are evenly distributed around said centrally located bare conductor to provide consistent stiffness and flexibility to prevent fault due to flexion.

10. The composite cable as claimed in claim 9, wherein said evenly distributed components are helically stranded around said centrally located bare conductor in a lay length of substantially 3-7 inches.

11. The composite cable as claimed in claim 1, wherein said shield protects said fiber optic elements therein from said e-beam processing irradiation of said jacket.

* * * * *